US007667769B2

(12) United States Patent
Gao et al.

(10) Patent No.: US 7,667,769 B2
(45) Date of Patent: Feb. 23, 2010

(54) ROTATABLE WIRELESS ELECTRICAL COUPLER

(75) Inventors: Robert S. Gao, Syosset, NY (US); Edward J. Freeman, Pittsboro, IN (US); Kenneth L. Addy, Massapequa, NY (US); Robert E. Lee, Garden City, NY (US)

(73) Assignee: Honeywell International Inc., Morristown, NJ (US)

( * ) Notice: Subject to any disclaimer, the term of this patent is extended or adjusted under 35 U.S.C. 154(b) by 925 days.

(21) Appl. No.: 10/889,651

(22) Filed: Jul. 12, 2004

(65) Prior Publication Data

US 2006/0007350 A1 Jan. 12, 2006

(51) Int. Cl.
*H04N 5/225* (2006.01)
*G03B 17/00* (2006.01)

(52) U.S. Cl. ...................................... 348/374; 396/427

(58) Field of Classification Search ................. 348/143, 348/151–155, 373–376; 396/419, 427
See application file for complete search history.

(56) References Cited

U.S. PATENT DOCUMENTS

| | | | | |
|---|---|---|---|---|
| 4,242,666 A | * | 12/1980 | Reschovsky et al. | 340/870.28 |
| 5,111,288 A | * | 5/1992 | Blackshear | 348/143 |
| 5,711,893 A | | 1/1998 | Park | |
| 5,739,986 A | * | 4/1998 | Van Vlerken et al. | 360/281.8 |
| 6,101,084 A | * | 8/2000 | Rakov | 361/301.2 |
| 6,393,199 B1 | * | 5/2002 | Lemke et al. | 386/67 |
| 6,509,926 B1 | * | 1/2003 | Mills et al. | 348/143 |
| 2003/0090353 A1 | * | 5/2003 | Robinson et al. | 335/220 |

FOREIGN PATENT DOCUMENTS

EP 708436 A2 10/1995

OTHER PUBLICATIONS

Panasonic web page, ptz dome cameras, dated Jun. 30, 2004.
Samsung web page, Rotary Transformer, dated Jun. 30, 2004.
Hitachi web page on rotary transformers, dated Jun. 30, 2004.
FDK web page on rotary transformers, dated Jun. 30, 2004.
Product Brochure for Rapid Dome Gold Indoor Domes by ADEMCO, dated Mar. 2002.

(Continued)

*Primary Examiner*—Timothy J Henn
(74) *Attorney, Agent, or Firm*—Husch Blackwell Sanders Welsh & Katz

(57) ABSTRACT

A rotatable wireless electrical coupler is disclosed that presents a wireless alternative to mechanical slip rings, such as are used in rotatable mechanical assemblies such as dome cameras. The rotatable wireless electrical coupler is designed to provide for the wireless transfer therethrough of electrical power, video and data signals. A rotatable multi-function transformer of the electrical coupler is designed primarily for the transfer of electrical power therethrough, and can also be used for the transfer of data signals. A rotatable electrical capacitor of the electrical coupler is designed primarily for the transfer of video data signals therethrough, and can also be used for the transfer of control and feedback data signals. In a dome camera, the rotatable wireless electrical coupler transfers power and data signals to and from a rotatable platform/section on which is mounted a video camera, pan and tilt motors and other associated electrical components.

31 Claims, 4 Drawing Sheets

OTHER PUBLICATIONS

Product Brochure for Rapid Dome Gold Indoor Domes, High-Speed Environmental Domes, by ADEMCO, dated Mar. 2002.
Product Brochure for Rapid Dome Indoor Domes, High-Speed Environmental Domes, by ADEMCO, dated Mar. 2002.
Product Brochure for Rapid Dome Indoor Domes, by ADEMCO, dated Mar. 2002.
Product Brochure for UltraDome KD6 High Speed Dome Tracking System, dated Mar. 15, 2002.

* cited by examiner

ROTATABLE WIRELESS ELECTRICAL COUPLER

BACKGROUND OF THE INVENTION

1. Field of the Invention

The present invention relates generally to a rotatable wireless electrical coupler that provides an alternative to and replacement for mechanical slip rings in rotatable mechanical assemblies in general, and more particularly pertains to a rotatable wireless electrical coupler that provides an alternative to and replacement for mechanical slip rings in dome panning video cameras.

2. Discussion of the Prior Art

The present state of the art in dome video cameras connects a dome camera, which includes a security video camera and associated electrical and mechanical components mounted on a rotatable platform/section covered by a dome, to electrical power and the data network of a security system by using a multiple conductor mechanical slip ring assembly.

Dome cameras are frequently used in security surveillance systems to provide video images of observed areas of a premises protected by the security systems. Dome cameras are frequently mounted in the ceiling (or on a pole, wall or roof) at strategic locations above the protected premises, and include a video camera mounted above and in a dome generally mounted on the ceiling. The dome camera is rotatably mounted and driven by a pan motor about a generally vertical axis, such that the dome camera can rotatably pan about the vertical axis to provide a 360 degree panoramic view of the protected premises, and is also rotatably mounted and driven by a tilt motor about a generally horizontal axis to provide a vertically variable field of view, variable from a view just below the horizon to a view more vertically below the dome camera, such that the two axes of rotational freedom provide the camera with a versatile capability of viewing many different areas of the protected premises.

The rotatably mounted camera typically includes a mechanical slip ring assembly with a plurality (e.g. 6) of slip rings positioned vertically stacked around a vertical axis of rotation to provide for the transfer of electrical power to all of the components on a rotatable platform/section, including the video camera and its associated electrical circuitry and pan and tilt motors and their associated electrical circuitry, and to carry video signals from the video camera to the video switching or processing system of the security system, and also to carry control and feedback data signals to and from the video camera, pan and tilt motors and other associated electrical components. The mechanical slip ring assembly is one of the more expensive components of a dome camera, has only fair reliability, and frequently any repair work is very labor intensive.

SUMMARY OF THE INVENTION

The present invention provides a rotatable wireless electrical coupler that presents a wireless alternative to mechanical slip rings, such as are used in many rotatable mechanical assemblies in general and in dome cameras in particular. The rotatable wireless electrical coupler is designed to provide for the wireless transfer therethrough of electrical power, video and other data signals. A rotatable multi-function transformer of the electrical coupler is designed primarily for the transfer of electrical power therethrough, and can also be used for the transfer of data signals. A rotatable electrical capacitor of the electrical coupler is designed primarily for the transfer of video data signals therethrough, and can be also be used for the transfer of other control data signals.

Moreover, the rotatable electrical capacitor has general utility by itself as a rotatable coupler for rotatable mechanical assemblies in general for the transfer of video and other data signals therethrough, aside from its utility in a rotatable wireless electrical coupler that also includes a rotatable multi-function transformer.

In a dome camera, the rotatable wireless electrical coupler transfers power, video and other data signals to and from a rotatable platform/section on which is mounted a video camera, a pan motor, a tilt motor and other associated electrical components. The rotatable transformer of the electrical coupler is designed primarily for the transfer of electrical power therethrough, and can also be used for the transfer of data signals. The rotatable electrical capacitor of the electrical coupler is designed primarily for the transfer of video data signals from the video camera on the rotatable platform, and can also be used for the transfer of other control and feedback data signals.

BRIEF DESCRIPTION OF THE DRAWINGS

The foregoing objects and advantages of the present invention for a rotatable wireless electrical coupler may be more readily understood by one skilled in the art with reference being had to the following detailed description of several embodiments thereof, taken in conjunction with the accompanying drawings in which.

DETAILED DESCRIPTION OF THE INVENTION

Figure 1:
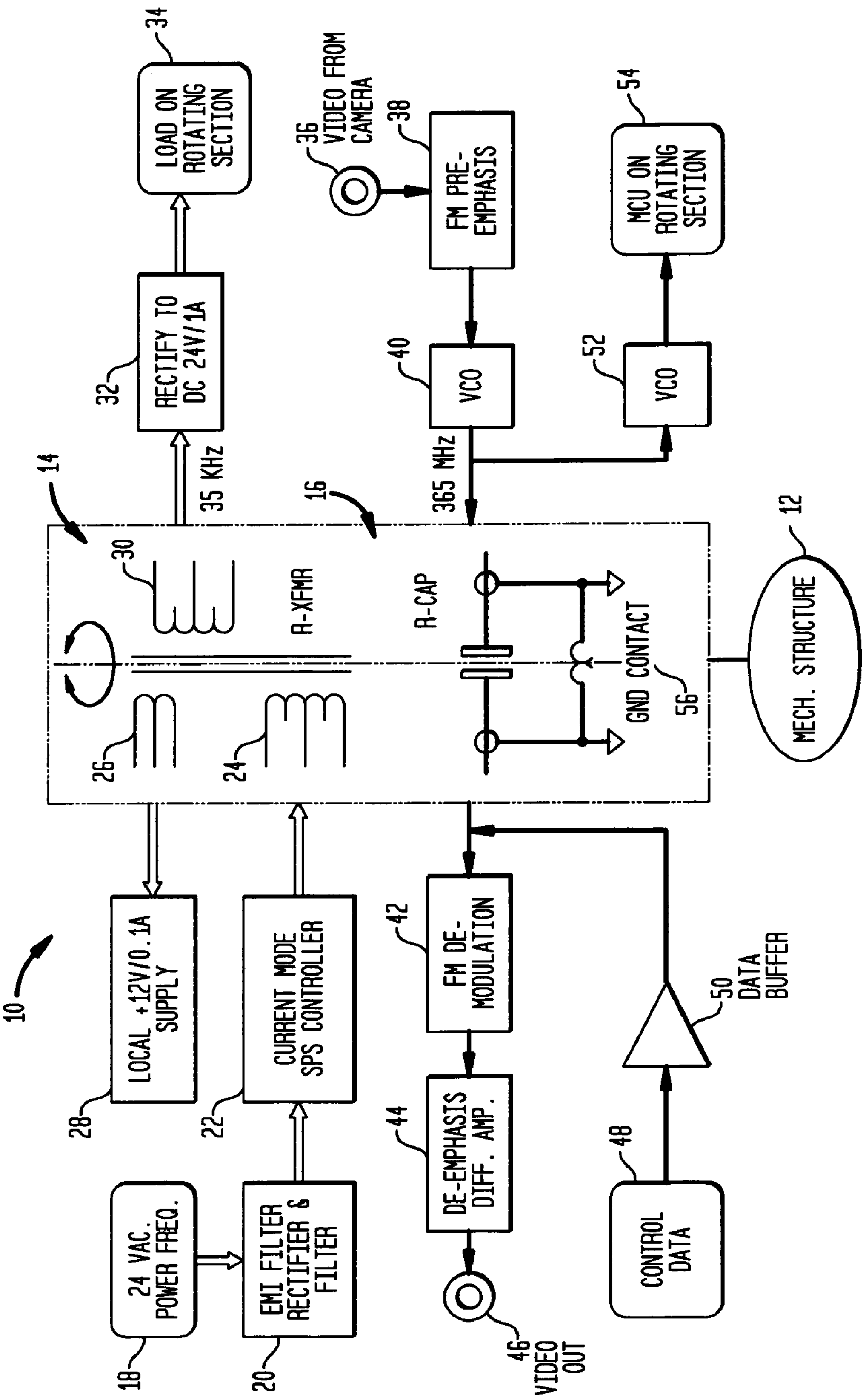
FIG. 1 illustrates a conceptually simplified embodiment of the present invention for a rotatable wireless electrical coupler that is designed to provide for the wireless transfer of electrical power and data signals across and through the electrical coupler, including a rotatable multi-function transformer designed primarily for the transfer of electrical power, and a rotatable electrical capacitor designed primarily for the transfer of video data signals.

FIG. 1 illustrates a conceptually simplified embodiment of the present invention for a rotatable wireless electrical coupler 10 that provides an alternative to and replacement for mechanical slip rings in rotatable mechanical assemblies. The wireless electrical coupler is supported for rotational movements by a schematically illustrated mechanical structure 12. The rotatable wireless electrical coupler 10 is designed to provide for the wireless transfer of electrical power and video and other data signals across and through the rotatable wireless electrical coupler. The rotatable wireless electrical coupler 10 includes a rotatable multi-function transformer 14 designed primarily for the transfer of electrical power through the rotatable wireless electrical coupler, and also in some embodiments data signals, to a rotatable platform/section including the video camera, pan and tilt motors and other associated electrical components mounted thereon. The rotatable wireless electrical coupler 10 also includes a rotatable electrical capacitor 16 designed primarily for the transfer of video data signals from the rotatable platform through the rotatable electrical coupler.

The rotatable multi-function transformer 12 preferably includes a ferrite pot core transformer having a minimal gap between the relatively rotatable components of the transformer, operating at a frequency of approximately 18 to 40 KHz, preferably at 19.2 or 38.4 KHz, although higher operating frequencies can also be implemented in other embodiments. The rotatable multi-function transformer 12 will be able to deliver a sufficient amount of electrical power to a security camera and the pan and tilt motors for the security camera, which is typically between 10 W and 25 W.

The 19.2 or 38.4 KHz operating frequency was chosen as they are almost beyond or beyond the audible frequency range, and can easily transfer RS-232 or RS-422 modulated control and feedback data. The 19.2 or 38.4 KHz signal can be phase locked to an AC power signal, which enables the line phase to be modulated onto the AC power signal. This arrangement will not introduce too much noise to the video signal on the rotatable capacitor and to the dome camera, and is operable for both 50 and 60 Hz AC power supplies.

A ferrite pot core transformer, as are generally commercially available, will work efficiently at the 19.2 or 38.4 KHz operating frequency or higher. A push-pull driver circuit can simplify the design of the overall circuit. A rotation induced voltage variation will be negligible at the 19.2 or 38.4 KHz operating frequency.

A ferrite sleeve can be used to increase the efficiency of the ferrite pot core transformer, and to minimize EMI (electromagnetic interference).

FIG. 1 illustrates an embodiment that includes a 24 VAC power supply 18, directed through an EMI filter rectifier and filter 20 to a current mode SPS (switched power supply) controller 22 to a stationary primary winding 24 of the rotatable transformer 14. This is inductively coupled by the transformer to a first stationary secondary winding 26 feeding a local 12 V (volt), 0.1 A (amp) local power supply 28 on a stationary section, and a second rotatable secondary winding 30 developing a, for example, 35 KHz power signal which is rectified at 32 to a 24 VDC, 1 A power supply for the electrical load 34 on a rotatable platform/section.

A separate pair of windings, not shown, can be used to separate a data signal from the AC power and to deliver up to 19,200-baud data, such as control and feedback signals for the equipment on the rotatable platform/section. The data can be modulated to positive and negative swings of the power supply AC signal to provide bi-directional communication. Coaxitron data, which is a format of data modulated onto video back porch and delivered in a coaxial cable, can be translated to an RS-422 format. A microcontroller can be utilized to control the camera and camera motors on the rotatable platform/section.

FIG. 1 illustrates the rotatable electrical capacitor 16 with the following associated circuitry. A video data signal 36 from the video camera is conditioned by an FM pre-emphasis section 38, and the data is modulated in a VCO (voltage controlled oscillator) 40 to produce a, for example, 365 MHz FM signal. This signal is transferred across the rotatable electrical capacitor 16 to an FM demodulator 42, the output of which is conditioned by a de-emphasis differential amplifier 44 to form a video data out signal at 46. The rotatable electrical capacitor is designed primarily for a unidirectional transfer of video data from the video camera to the security system. This arrangement should also be capable of carrying a digital video data stream.

FIG. 1 also illustrates a second data path through the rotatable electrical capacitor 16, wherein control data at 48 to control equipment on the rotatable platform/section, including the video camera and pan and tilt motors, is directed through a data buffer 50 through the rotatable electrical capacitor 16 to a data receiver 52, the output of which is directed to MCU (microcontroller unit) on the rotatable platform/section.

Data signals, including control and feedback signals for circuits on the rotatable platform/section, can also be transferred bidirectionally through the rotatable transformer by modulating the data to positive and negative swings of the power supply AC signal as described above. The rotatable electrical capacitor also includes a ground contact, indicated schematically at 56.

The rotatable electrical capacitor 16 is used primarily to couple 350~400 MHz frequency-modulated (FM) video data or a digital video data stream. Other frequency bands can be used as long as applicable FCC part 15 emissions limits are met. An exemplary capacitance for the rotatable capacitor 16 is 10 pf per cm coupling length, which is sufficient for the transferral of the video and control data. The rotatable electrical capacitor is preferably shielded to avoid EMI and RFI (radio-frequency interference) problems and to also provide protection against ESD (electro-static discharge).

A VCO (voltage controlled oscillator) IC with an output level of −10 dBm can be used in a transmitter with a PLL (phase locked loop) FM demodulator IC from Zarlink (or equivalent circuit) with typical sensitivity of −40 dBm. A typical specification of the demodulator includes a luminance nonlinearity of 1.9%, a DGDP (differential gain and differential phase) of 0.5% and of 1.0°, a SNR (signal to noise ratio) of 72 dB, and a tilt of 0.3%.

A 30 dBm power margin is sufficient for RF (e.g. FM) or a digital video stream at 350~400 MHz to be coupled over the rotatable electrical capacitor for video transmission.

A digital IQ demodulator is relatively inexpensive and can be used to modulate a digital video data stream to the preferred frequency.

Mechanical accuracy is provided by dome panning, and a precision bracket assembly maintains the air gap of the rotatable transformer at 0.1 mm or less, preferably about 0.05 mm.

Figure 2:
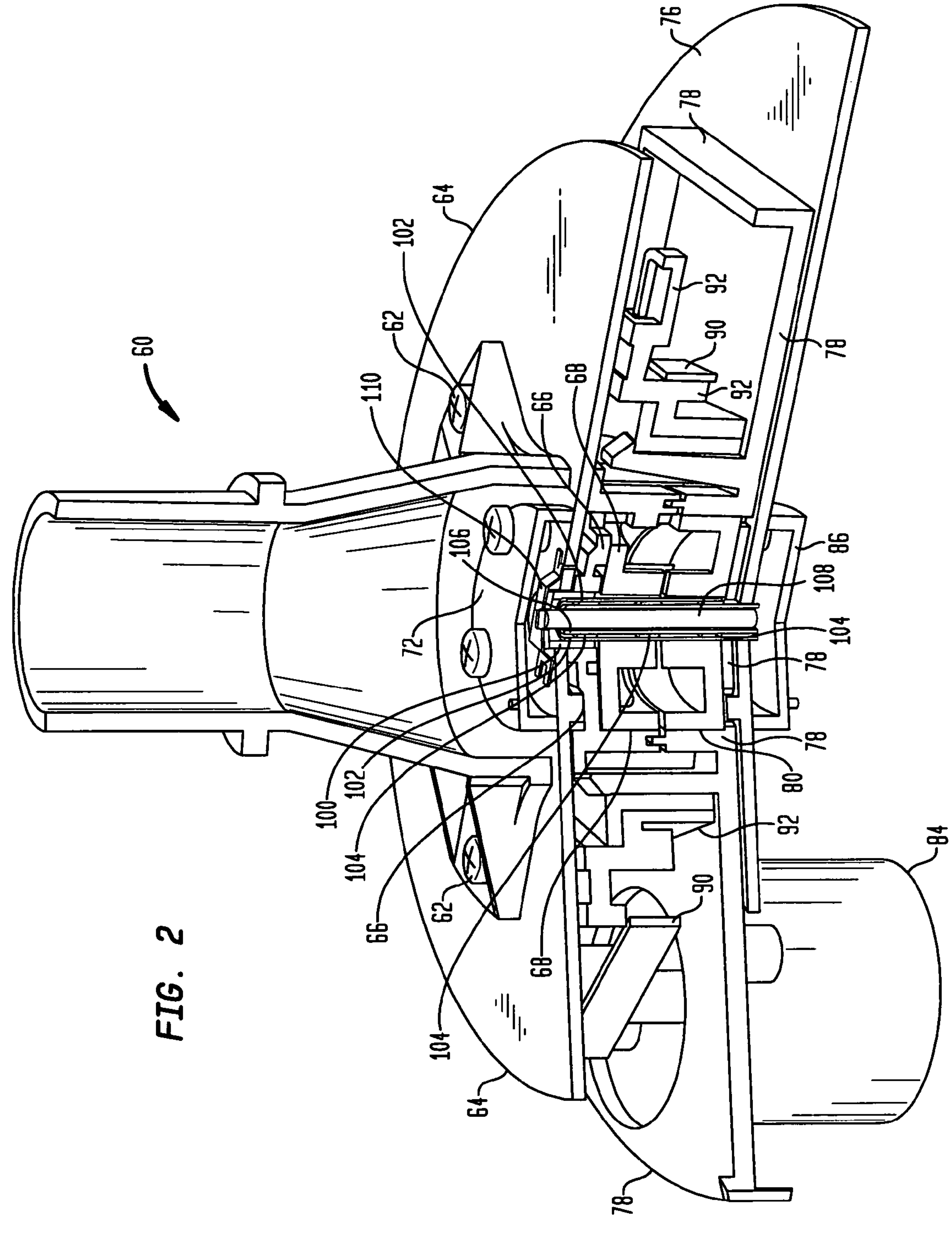
FIG. 2 illustrates a cut away sectional view of one embodiment of a mechanical assembly of a portion of a dome camera including the rotatable wireless electrical coupler of the present invention.
Figure 3:
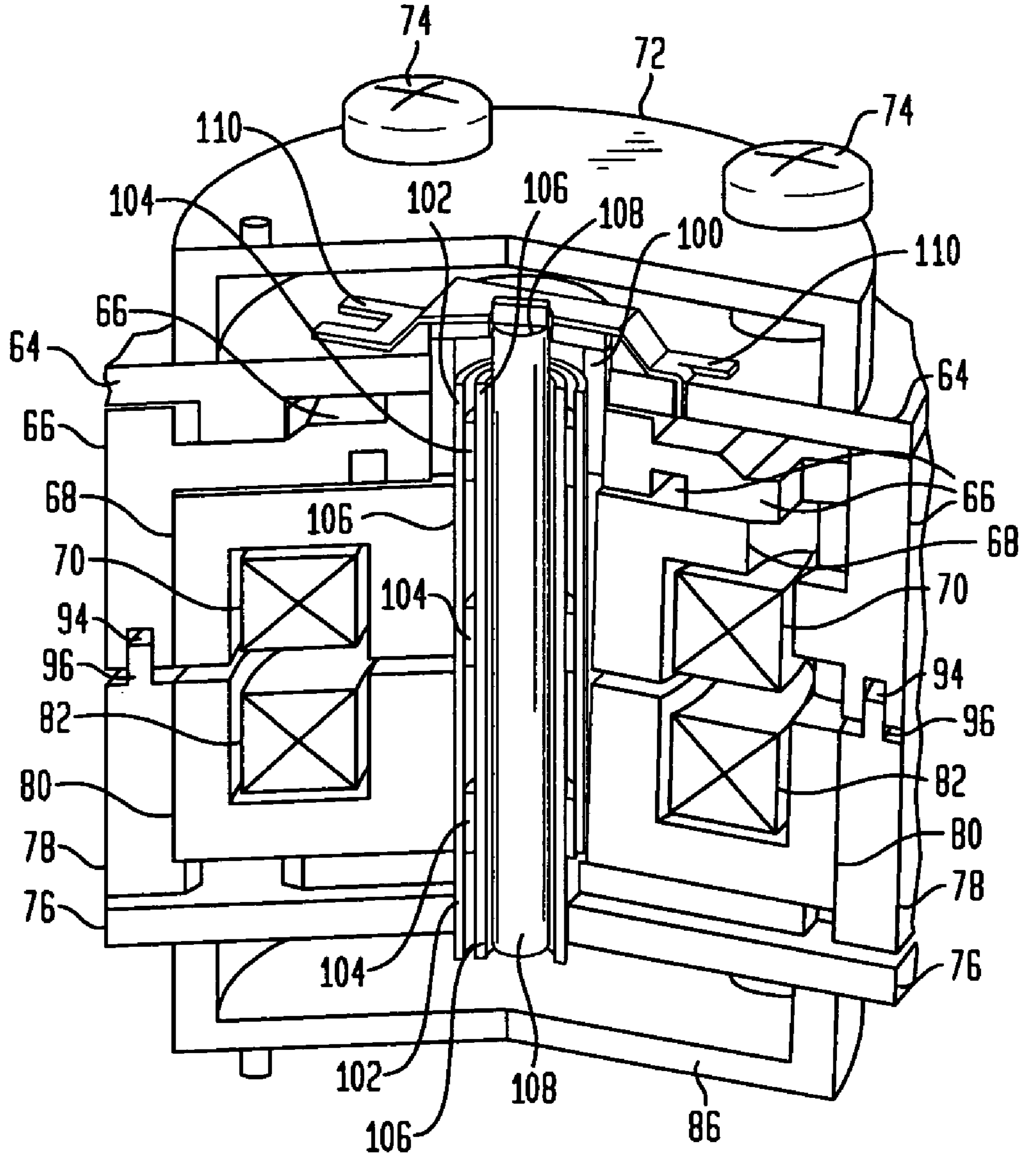
FIG. 3 illustrates an enlarged cut away sectional view of the electrical components of the rotatable wireless electrical coupler of FIG. 2.

FIG. 2 illustrates a cut away sectional view of one embodiment of a mechanical assembly of a portion of a dome camera support, and FIG. 3 illustrates an enlarged cut away sectional view of the electrical components of the rotatable wireless electrical coupler of FIG. 2.

Referring initially to FIGS. 2 and 3, a dome camera mounting shaft 60, on which the entire dome video camera assembly is mounted, is secured by screws 62 onto a first generally round PC board 64. A plastic support bracket 66 supports the PC board 64, and generally surrounds and is secured to the upper half 68 of a ferrite core of a transformer that houses an upper transformer coil winding 70, shown only in FIG. 3. These components form a stationary section, relative to which a rotatable platform/section rotates, to rotationally pan the video camera. An RF shield 72 is secured around the top of the assembly by screws 74.

The rotatable platform/section rotates relative to the stationary, rotationally fixed section as described above. The rotatable platform/section includes a generally round PC board 76, and a large plastic support bracket 78. The support bracket 78 generally surrounds and secures the lower rotatable half 80 of a ferrite core of a transformer that houses a lower transformer coil winding 82, shown only in FIG. 3. The plastic support bracket 78 supports a pan motor 84 and the PC board 76. An RF shield 86 is secured around the bottom of the assembly. These components form the rotatable platform/section.

The pan motor 84 rotates a belt 90, shown on the left and right sides of FIG. 2, that encircles a gear 92 that controls rotation of the rotatable platform/section. The plastic support bracket 66 includes a circular groove 94 that rotates relative an encompassed circular rim 96 of the lower plastic support bracket 78. The tilt motor, not shown, is also mounted on the rotatable platform/section, with the mounted positions of the pan motor and tilt motor being selected to dynamically balance each other, although other mounting arrangements not on the rotatable platform/section are also possible.

The rotatable transformer 14 is formed by the ferrite pot cores, and the upper stationary transformer coil winding 70 and the lower rotatable transformer coil winding 82.

The rotatable electrical capacitor 16 is formed along the central portion of the rotatable wireless electrical coupler assembly as follows. A cylindrical shaped ground contact 100, which functions as the ground contact 56 of FIG. 1, surrounds the upper end of an outer ground tube 102 that extends from the bottom RF shield 86 to just below the top PC board 64. The cylindrical shaped ground contact 100 provides ESD protection and also provides an RF signal return path. The outer ground tube 102 provides shielding for the video signal transferred through the rotatable electrical capacitor from the transformer and other potential sources of electrical noise.

The outer ground tube 102 is concentrically mounted by three Teflon insulator rings 104 around an intermediate data tube 106 which forms an outer cylindrical capacitor electrode of the rotatable electrical capacitor, and both the outer ground tube 102 and the intermediate data tube 106 are fixedly mounted by solder and mechanical interlocking to the lower PC board 76 for rotation therewith. The Teflon insulator rings 104 are introduced to maximize the air space and minimize the equivalent permittivity between the outer ground tube 102 and the intermediate data tube 106 to increase coupling efficiency across a capacitance formed between the intermediate data tube 106 and an inner data rod 108, which forms an inner cylindrical capacitor electrode of the rotatable electrical capacitor. The capacitance formed between the intermediate data tube 106 and the inner data rod 108 is the capacitance across which the video data is transmitted as discussed below.

The inner data rod 108 is concentrically mounted within the intermediate data tube 106. The inner data rod 108 and the ground contact 100 are fixedly mounted by solder and mechanical interlocking to the top PC board 64 on the stationary section. A spring contact clip 110 at the upper end of the inner data rod provides a resilient electrical contact against the top end of the inner data rod 108.

The arrangement is such that the data rod 108, which is a part of the fixedly mounted upper section, is fixedly mounted within the rotating outer ground tube 102 and the rotating intermediate data tube 106, which are part of the lower rotatable platform/section.

The design of the rotatable transformer 14 is such that the lower half 80 of the ferrite core transformer rotates relative to the upper half 68 of the ferrite core transformer with a minimal gap (e.g. 0.05 mm) between the two relatively rotatable halves of the ferrite core transformer. A spring load was introduced to maintain a minimal and constant gap. In practice, this can be achieved with an O-ring or a wave washer. In practice, a thin Teflon film washer was introduced between the two halves of the ferrite core transformer to minimize friction, and after an extended operation, the thin Teflon ring wore away, leaving a thin Teflon film/coating separating the two halves of the ferrite core transformer with the minimal air gap.

In the rotatable electrical capacitor 16, Teflon rings separate the inner data rod 108, which is mounted stationary relative to the rotatable intermediate data tube 106, with a minimal gap between the inner data rod 108 and the intermediate data tube 106. These Teflon rings will not wear away (because they are not being subjected to a load) other than during an initial break in period where there may be an interference fit.

In the design of the rotatable electrical capacitor 16, a first capacitance C1 exists between the outer ground tube 102 and the intermediate data tube 106, a second capacitance C2 exists between the intermediate data tube 106 and the inner data rod 108, and a third capacitance C3 exists between the inner data rod 108 and the outer ground tube 102. In the design of the rotatable electrical capacitor 16, the third capacitance C3 is relatively small and is not very controllable, while the video data is transferred through the second capacitance C2 between the intermediate data tube 106 and the inner data rod 108, which accordingly is maximized in the design, while the first capacitance C1 between the outer ground tube 102 and the intermediate data tube 106 is a wasted capacitance and should be minimized.

Figure 4:
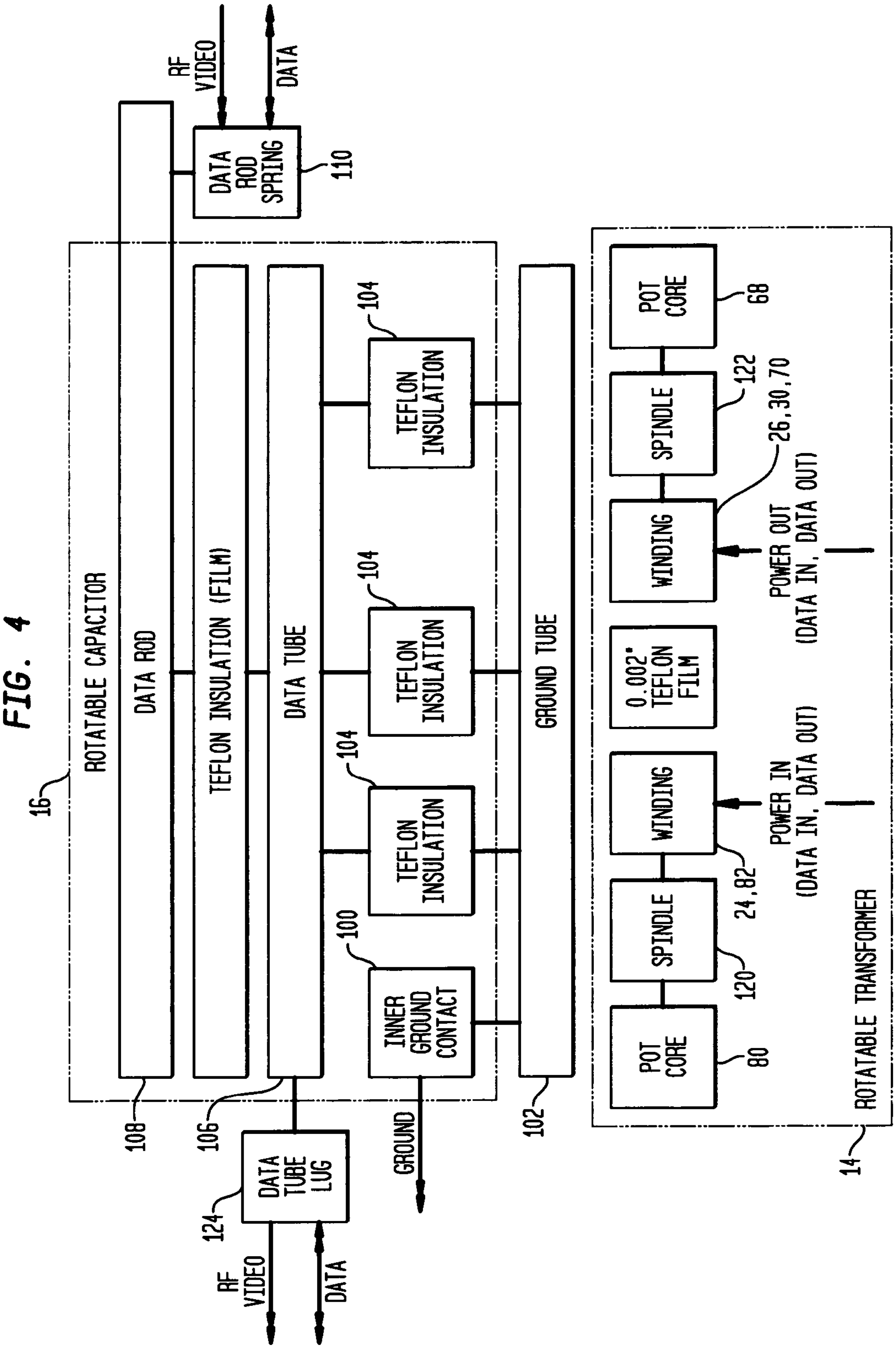
FIG. 4 is a block diagram of the major components and power and data signals through the rotatable wireless electrical coupler of the present invention, and illustrates schematically both the rotatable transformer and the rotatable capacitor.

FIG. 4 is a block diagram of the major components and power and data signals through the rotatable wireless electrical coupler of the present invention, and illustrates schematically both the rotatable transformer 14 and the rotatable electrical capacitor 16.

The rotatable transformer 14 includes a stationary section comprising the primary transformer winding 24 of FIG. 1, or the primary transformer winding 82 of FIGS. 2, 3, including a spindle 120 (not illustrated in FIGS. 2, 3) and the pot core 88, and shows power, and optionally data in/out, being transferred to the primary transformer winding. The rotatable platform/section comprises the secondary transformer winding 30 of FIG. 1, or the secondary transformer winding 70 of FIGS. 2, 3, including a spindle 122 (not illustrated in FIGS. 2, 3) and the pot core 88, and shows power, and optionally data in/out, being transferred from the secondary transformer winding.

The rotatable electrical capacitor 16 includes a rotatable section comprising the data tube 106 that is separated from the ground tube 102 by the Teflon insulators 104, with the data tube communicating RF video data out, and bidirectional control data through a contact data tube lug 124 (not illustrated in FIGS. 2, 3), and the ground tube 106 connected to ground through the ground contact 100 for RF return signal. The stationary section includes the inner data rod 108, and FIG. 4 shows RF video data being transferred in through the rotatable wireless electrical coupler, and optionally bi-directional control data, being transferred through the data rod contact spring 110.

The rotatable electrical capacitor 16 has general utility by itself as a rotatable electrical coupler for rotatable mechanical assemblies in general for the transfer of analog and/or digital data signals including video and other data signals therethrough, aside from its utility in a rotatable wireless electrical coupler that also includes a rotatable multi-function transformer 14.

In one tested embodiment, a 1.5 MHz frequency was used to transfer data, and the 365-408 MHz frequency range was used to transfer video. However, the present invention has practical applications and will work in a 1 MHz-1 GHz frequency range. Moreover, by reducing the capacitance C2, the present invention will operate at several GHz, with the disadvantage that a GHz circuit is relatively expensive.

While several embodiments and variations of the present invention for a rotatable wireless electrical coupler are described in detail herein, it should be apparent that the disclosure and teachings of the present invention will suggest many alternative designs to those skilled in the art.

What is claimed is:

1. A rotatable wireless electrical coupler having a first rotatable section that is rotatable relative to a second section, and designed to provide for the wireless transfer therethrough of electrical power and data signals between the first rotatable section and the second section, comprising:

a rotatable transformer for transferring power therethrough, said rotatable transformer including a first rotatable winding section and a second winding section, which winding sections rotate relative to one another around a common rotational axis; and a rotatable electrical capacitor for transferring analog or digital data signals therethrough, said rotatable electrical capacitor including a first rotatable capacitor electrode and a second capacitor electrode, which capacitor electrodes rotate relative to one another around the common rotational axis, wherein the rotatable electrical capacitor includes an inner data rod, an intermediate data tube and an outer ground tube, with the inner data rod and the intermediate data tube being concentrically mounted within the outer ground tube, and wherein video data is transferred between the intermediate data tube and the inner data rod, wherein the rotatable electrical capacitor extends through the rotatable transformer along the rotational axis of the rotatable transformer and wherein the rotational axis of the rotatable transformer and electrical capacitor are coextensive and wherein the rotatable electrical capacitor is formed along a central portion of the rotatable wireless electrical coupler and wherein a spring contact provides a resilient electrical contact against one end of the inner data rod which is part of the second section and is mounted within the rotatable data tube which is a part of the first rotatable section.

2. The rotatable wireless electrical coupler of claim 1, wherein the rotatable electrical capacitor transfers video data signals.

3. The rotatable wireless electrical coupler of claim 1, wherein the rotatable transformer also transfers data signals.

4. The rotatable wireless electrical coupler of claim 1, in a dome camera wherein the rotatable wireless electrical coupler transfers power, video and/or data signals to and from the first rotatable section on which is mounted a video camera, a tilt motor to tilt the video camera, and/or a pan motor to pan the video camera, and associated electrical equipment.

5. The rotatable wireless electrical coupler of claim 1, including an AC power supply directed through an SPS (switched power supply) controller to a primary winding of the rotatable transformer, which is inductively coupled by the rotatable transformer to a first secondary winding of a local power supply and to a second secondary winding to develop an AC power supply which is rectified to a DC power supply for electrical equipment on the first rotatable section.

6. The rotatable wireless electrical coupler of claim 1, wherein the rotatable wireless electrical coupler includes control and feedback signals for electrical equipment on the first rotatable section.

7. The rotatable wireless electrical coupler of claim 1, wherein data signals for electrical equipment on the first rotatable section are transferred bidirectionally through the rotatable transformer by modulating the data signals to positive and negative swings of an AC power supply signal.

8. The rotatable wireless electrical coupler of claim 1, wherein a video data signal from a video camera is modulated to produce an RF signal that is transferred across the rotatable electrical capacitor to a receiver, the output of which forms a video data out signal.

9. The rotatable wireless electrical coupler of claim 1, wherein a video data signal from a video camera is converted to a digital data stream that is transferred through the rotatable electrical capacitor.

10. The rotatable wireless electrical coupler of claim 1, wherein control data to control electrical equipment on the first rotatable section is directed through a data buffer through the rotatable electrical capacitor to a data receiver, the output of which is directed to a microcontroller unit on the first rotatable section.

11. The rotatable wireless electrical coupler of claim 1, wherein the first rotatable section includes a video camera, and a support bracket secured to a PC board and also secured to a portion of the rotatable transformer.

12. The rotatable wireless electrical coupler of claim 1, wherein the second section includes a support bracket that supports a portion of the rotatable transformer and also supports a PC board.

13. The rotatable wireless electrical coupler of claim 1, wherein an RF shield is secured around the first rotatable section.

14. The rotatable wireless electrical coupler of claim 1, wherein an RF shield is secured around the second section.

15. The rotatable wireless electrical coupler of claim 1, wherein the rotatable electrical capacitor includes an inner cylindrical capacitor electrode and an outer cylindrical capacitor electrode, with the inner cylindrical capacitor electrode and the outer cylindrical data capacitor electrode being concentrically mounted about a central longitudinal axis for relative rotational movement between the inner cylindrical capacitor electrode and the outer cylindrical capacitor electrode.

16. The rotatable wireless electrical coupler of claim 15, wherein an outer ground tube is mounted around the outer cylindrical capacitor electrode and provides shielding for a signal transferred between the inner cylindrical capacitor electrode and the outer cylindrical capacitor electrode from electrical noise including electrical noise from the rotatable transformer.

17. The rotatable wireless electrical coupler of claim 16, wherein both the outer ground tube and the outer cylindrical capacitor electrode are mounted for relative rotational movement relative to the inner cylindrical capacitor electrode.

18. The rotatable wireless electrical coupler of claim 15, wherein the second section is a stationary mounted section, and the first rotatable section rotates relative to the second stationary mounted section.

19. The rotatable wireless electrical coupler of claim 1, wherein a cylindrical shaped ground contact surrounds one end of the ground tube and provides ESD (electrostatic discharge) protection and also provides an RF signal return path.

20. A rotatable wireless electrical coupler having a first rotatable section that is rotatable relative to a second section, and designed to provide for the wireless transfer therethrough of electrical power and data signals between the first rotatable section and the second section, comprising:

a rotatable transformer for transferring power therethrough. said rotatable transformer including a first rotatable winding section and a second winding section, which winding sections rotate relative to one another around a common rotational axis; and a rotatable electrical capacitor for transferring analog or digital data signals therethrough, said rotatable electrical capacitor including a first rotatable capacitor electrode and a second capacitor electrode, which capacitor electrodes rotate relative to one another around the common rotational axis, wherein the rotatable electrical capacitor includes an inner data rod, an intermediate data tube and an outer ground tube, with the inner data rod and the intermediate data tube being concentrically mounted within the outer ground tube, and wherein video data is transferred between the intermediate data tube and the inner data rod, wherein the rotatable electrical capacitor extends through the rotatable transformer along the rotational axis of the rotatable transformer and wherein the rotational axis of the rotatable transformer and electrical capacitor are coextensive wherein the rotatable electrical capacitor is formed along a central portion of the rotatable wireless electrical coupler and wherein a first capacitance C1 exists between the outer ground tube and the intermediate data tube, and a second capacitance C2 exists between the intermediate data tube and the inner data rod, and the video data is transferred through the second capacitance C2 between the intermediate data tube and the inner data rod which is maximized by increasing by increasing the coupling efficiency across the second capacitance C2, while the first capacitance C1 between the outer ground tube and the intermediate data tube is minimized by reducing the equivalent permittivity between the outer ground tube and the intermediate data tube.

21. A rotatable wireless electrical coupler having a first rotatable section that is rotatable relative to a second section, and designed to provide for the wireless transfer of data signals between the first rotatable section and the second section, comprising a rotatable electrical capacitor, including a first rotatable capacitor electrode and a second capacitor electrode, which capacitor electrodes rotate relative to one another, for transferring data signals therethrough, wherein the rotatable electrical capacitor includes an inner data rod, an intermediate data tube and an outer ground tube, with the inner data rod concentrically and rotatably mounted within the intermediate data tube, the intermediate data tube being concentrically mounted within the outer ground tube, wherein the inside surface of the intermediate data tube and outside surface of the inner data rod form opposing surfaces of the rotatable electrical capacitor, and wherein video data is transferred between an inside surface of the intermediate data tube and an outside surface of the inner data rod and wherein a spring contact provides a resilient electrical contact against one end of the inner data rod which is mounted within the rotatable data tube.

22. The rotatable wireless electrical coupler of claim 21, wherein the first rotatable capacitor electrode comprises an outer cylindrical capacitor electrode and the second capacitor electrode comprises an inner cylindrical capacitor electrode, with the outer cylindrical capacitor electrode and the inner cylindrical capacitor electrode being concentrically mounted about a central longitudinal axis for relative rotational movement between the outer cylindrical capacitor electrode and the inner cylindrical capacitor electrode.

23. The rotatable wireless electrical coupler of claim 22, wherein an outer ground tube is mounted around the outer cylindrical capacitor electrode and provides shielding for a signal transferred between the outer cylindrical capacitor electrode and the inner cylindrical capacitor electrode from electrical noise.

24. The rotatable wireless electrical coupler of claim 23, wherein both the outer ground tube and the outer cylindrical capacitor electrode are mounted for relative rotational movement relative to the inner capacitor electrode.

25. The rotatable wireless electrical coupler of claim 21, wherein the second section is a stationary mounted section, and the first rotatable section rotates relative to the second stationary mounted section.

26. The rotatable wireless electrical coupler of claim 21, wherein the rotatable electrical capacitor includes a concentrically mounted inner data rod, intermediate data tube and outer ground tube, wherein the outer ground tube provides shielding for a signal transferred between the inner data rod and the intermediate data tube from electrical noise, with both the outer ground tube and the intermediate data tube being mounted for relative rotational movement relative to the inner data rod.

27. The rotatable wireless electrical coupler of claim 21, wherein a cylindrical shaped ground contact surrounds one end of the ground tube and provides ESD (electrostatic discharge) protection and also provides an RF signal return path.

28. A rotatable wireless electrical coupler having a first rotatable section that is rotatable relative to a second section, and designed to provide for the wireless transfer of data signals between the first rotatable section and the second section, comprising a rotatable electrical capacitor, including a first rotatable capacitor electrode and a second capacitor electrode, which capacitor electrodes rotate relative to one another, for transferring data signals therethrough, wherein the rotatable electrical capacitor includes an inner data rod, an intermediate data tube and an outer ground tube, with the inner data rod concentrically and rotatablv mounted within the intermediate data tube, the intermediate data tube being concentrically mounted within the outer ground tube, wherein the inside surface of the intermediate data tube and outside surface of the inner data rod form opposing surfaces of the rotatable electrical capacitor, and wherein video data is transferred between an inside surface of the intermediate data tube and an outside surface of the inner data rod and wherein a first capacitance C1 exists between the outer ground tube and the intermediate data tube, and a second capacitance C2 exists between the intermediate data tube and the inner data rod, and data is transferred through the second capacitance C2 between the intermediate data tube and the inner data rod which is maximized by increasing the coupling efficiency across the second capacitance C2, while the first capacitance C1 between the outer ground tube and the intermediate data tube is minimized by reducing the equivalent permittivity between the outer ground tube and the intermediate data tube.

29. A rotatable wireless electrical coupler comprising:

a rotatable power transformer, the rotatable transformer including a first winding section and a second winding section, which winding sections rotate relative to one another around a common rotational axis; and a rotatable electrical capacitor for transferring analog or digital data signals therethrough, the rotatable electrical capacitor including a first rotatable capacitor electrode and a second capacitor electrode, which capacitor electrodes rotate relative to one another around the common rotational axis, wherein the rotatable electrical capacitor includes an inner data rod, an intermediate data tube and an outer ground tube, with the inner data rod and the intermediate data tube being concentrically mounted within the outer ground tube, and wherein video data is transferred between the intermediate data tube and the inner data rod, wherein the rotatable electrical capacitor extends through the rotatable transformer along the rotational axis of the rotatable transformer and wherein the rotational axis of the rotatable transformer and electrical capacitor are coextensive and wherein a spring contact provides a resilient electrical contact against one end of the inner data rod and is mounted within the rotatable data tube.

30. A coupler as in claim 29 which includes a video camera, and at least one of a tilt motor to tilt the video camera, or a pan motor to pan the video camera.

31. A coupler as in claim 30 wherein a first capacitance exists between the outer ground tube and the intermediate data tube, and a second capacitance exists between the intermediate data tube and the inner data rod, and where video data can be transferred through the second capacitance between the intermediate data tube and the inner data rod.

* * * * *

UNITED STATES PATENT AND TRADEMARK OFFICE

CERTIFICATE OF CORRECTION

PATENT NO. : 7,667,769 B2
APPLICATION NO. : 10/889651
DATED : February 23, 2010
INVENTOR(S) : Gao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1288 days.

Signed and Sealed this

Seventh Day of December, 2010

David J. Kappos

*Director of the United States Patent and Trademark Office*